(12) United States Patent
Lee

(10) Patent No.: US 10,773,791 B2
(45) Date of Patent: Sep. 15, 2020

(54) AIRCRAFT WITH STEALTH DOUBLE WINGS

(71) Applicant: Shih-Ping Lee, New Taipei (TW)

(72) Inventor: Shih-Ping Lee, New Taipei (TW)

(*) Notice: Subject to any disclaimer, the term of this patent is extended or adjusted under 35 U.S.C. 154(b) by 280 days.

(21) Appl. No.: 16/043,448

(22) Filed: Jul. 24, 2018

(65) Prior Publication Data

US 2020/0031452 A1    Jan. 30, 2020

(51) Int. Cl.
| | | |
|---|---|---|
| *B64C 5/12* | (2006.01) | |
| *B64C 5/16* | (2006.01) | |
| *B64D 7/00* | (2006.01) | |
| *B64C 5/08* | (2006.01) | |
| *B64C 30/00* | (2006.01) | |

(52) U.S. Cl.
CPC ............... *B64C 5/16* (2013.01); *B64C 5/08* (2013.01); *B64C 30/00* (2013.01); *B64D 7/00* (2013.01)

(58) Field of Classification Search
CPC .... B64C 3/00; B64C 3/38; B64C 5/08; B64C 5/10; B64C 5/12; B64C 5/16; B64C 7/00; B64C 30/00
See application file for complete search history.

(56) References Cited

U.S. PATENT DOCUMENTS

| | | | | |
|---|---|---|---|---|
| 3,132,825 A | * | 5/1964 | Postle ...................... | B64G 1/62 244/159.3 |
| 4,025,007 A | * | 5/1977 | Kaniut ...................... | B64C 3/00 244/15 |
| 4,354,646 A | * | 10/1982 | Raymer .................... | B64C 5/10 244/47 |
| 5,326,050 A | * | 7/1994 | Zell .......................... | B64C 5/12 244/99.1 |
| 6,471,158 B1 | * | 10/2002 | Davis ....................... | B64C 27/02 244/8 |
| 2004/0089765 A1 | * | 5/2004 | Levy ......................... | B64C 5/02 244/113 |
| 2009/0261204 A1 | * | 10/2009 | Pitt ........................... | B64C 21/08 244/201 |
| 2010/0032517 A1 | * | 2/2010 | Botich ..................... | B64C 27/82 244/17.21 |
| 2019/0202548 A1 | * | 7/2019 | Schloesser ............... | B64C 5/12 |
| 2019/0291849 A1 | * | 9/2019 | Kierbel .................... | B64C 9/00 |
| 2019/0351994 A1 | * | 11/2019 | Truhill ..................... | B64C 5/12 |

* cited by examiner

*Primary Examiner* — Michael H Wang
(74) *Attorney, Agent, or Firm* — Muncy, Geissler, Olds & Lowe, P.C.

(57) ABSTRACT

An aircraft with stealth double wings comprises a main body and stealth double wings. The main body has two main wings respectively having a surface into which a space is formed. The stealth double wings respectively are located in the spaces and include a first and a second rotating shaft, a link rod, a first and a second wing. The link rod has two ends respectively connected with the two rotating shafts. The two rotating shafts respectively have another end connected with the first and second wings. Thereby, when the first wing is moved to cover and enclose the space's opening, the second wing is driven to be located within the space, and when the first wing is moved upwardly away from the space, the second wing is driven to cover and enclose the space's opening, so as to keep the surface intact.

4 Claims, 20 Drawing Sheets

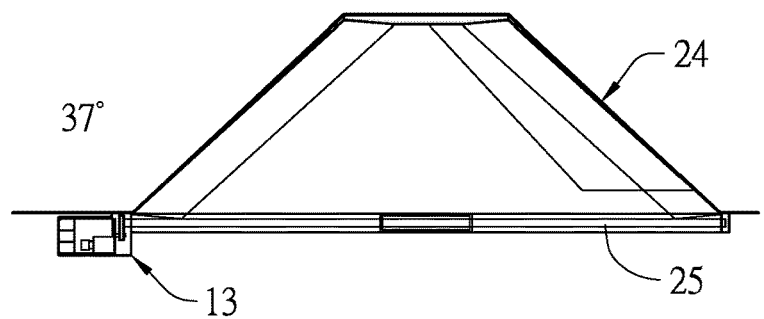
FIG. 3B
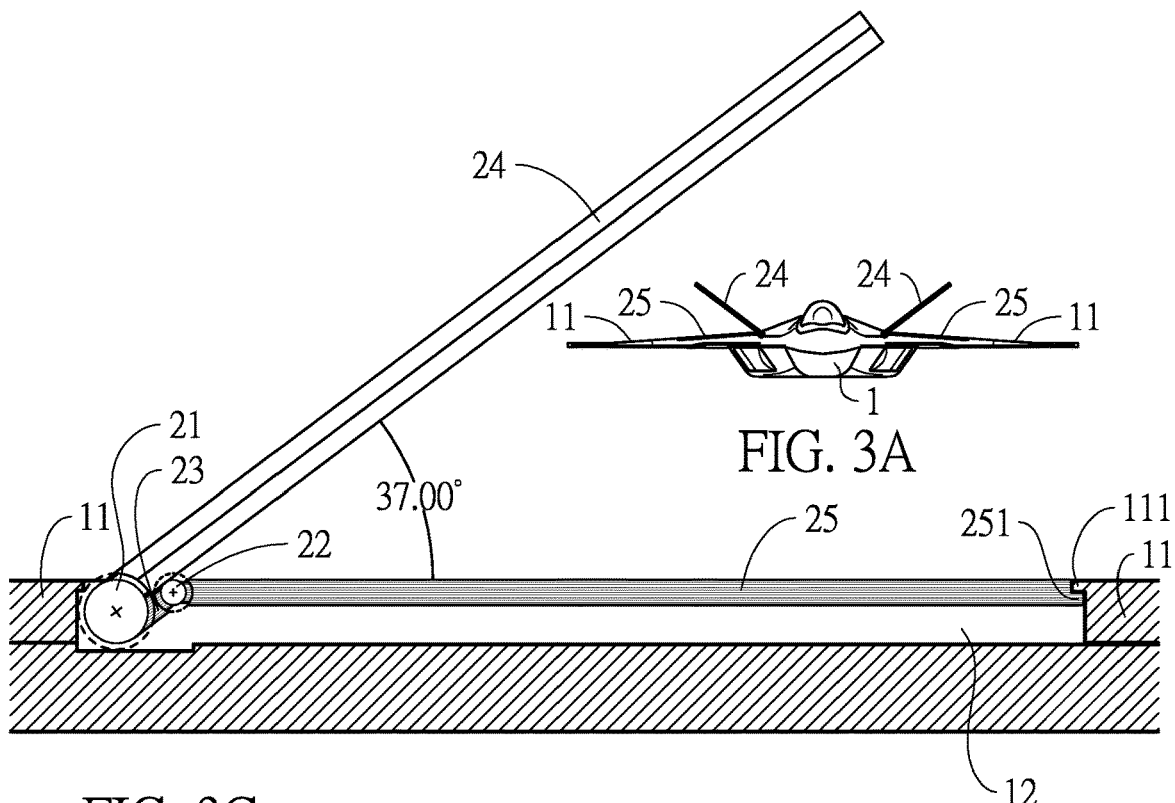
FIG. 3A
FIG. 3C
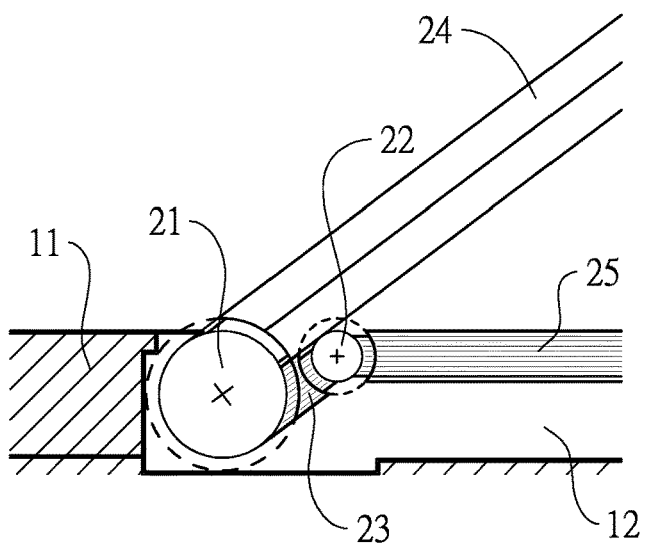
FIG. 3D

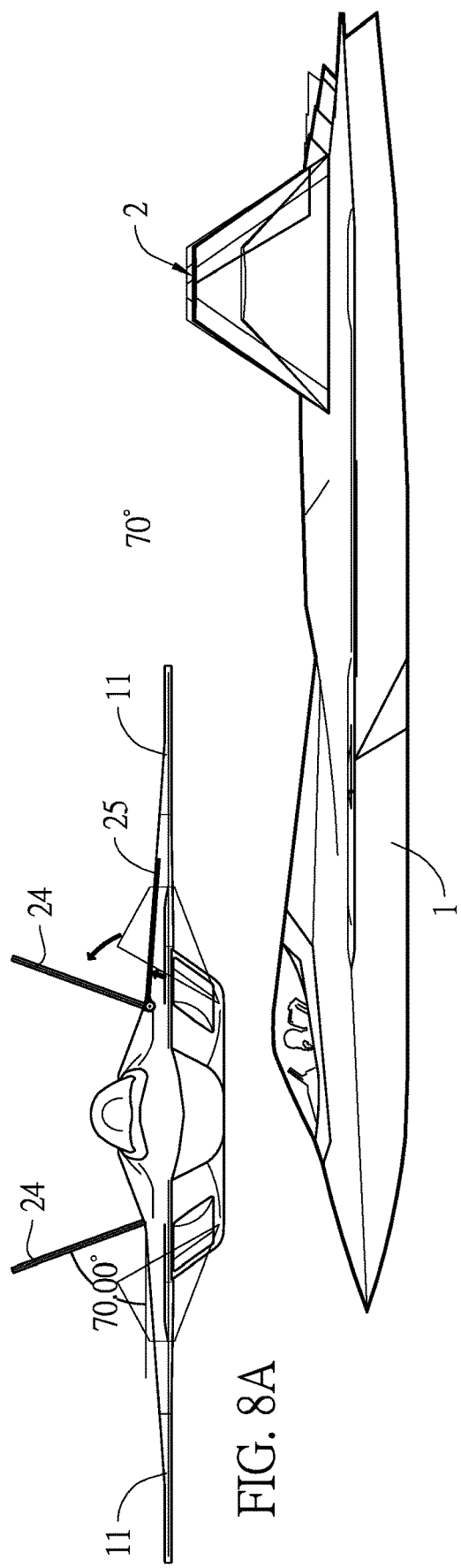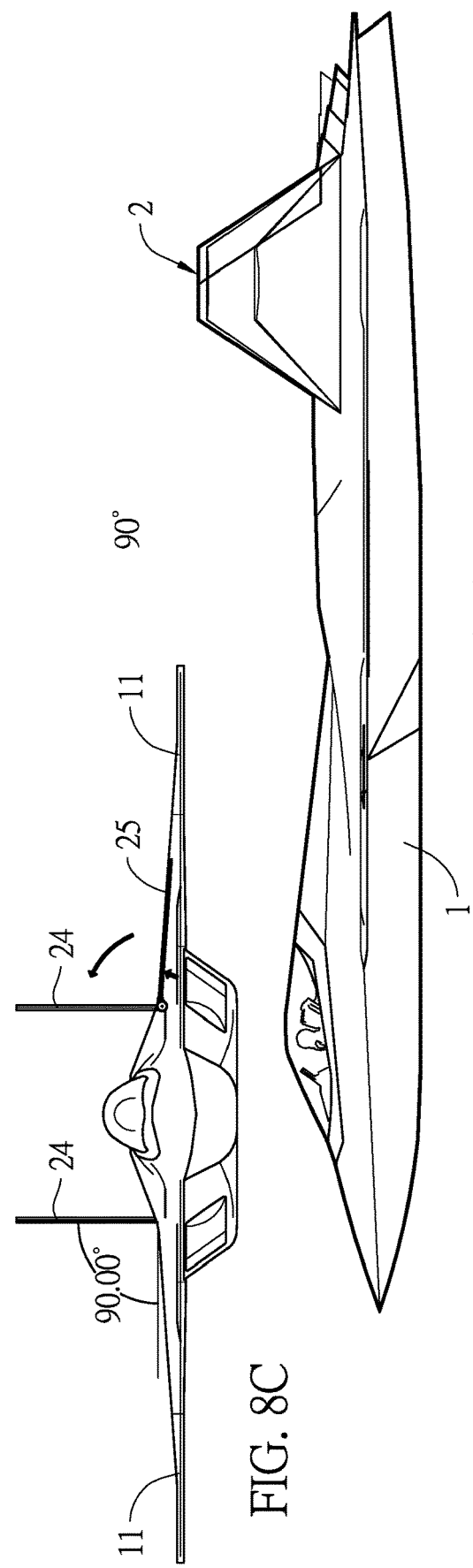
FIG. 8A  FIG. 8B  FIG. 8C  FIG. 8D

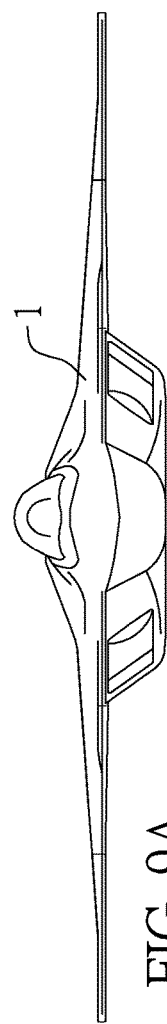
FIG. 9A
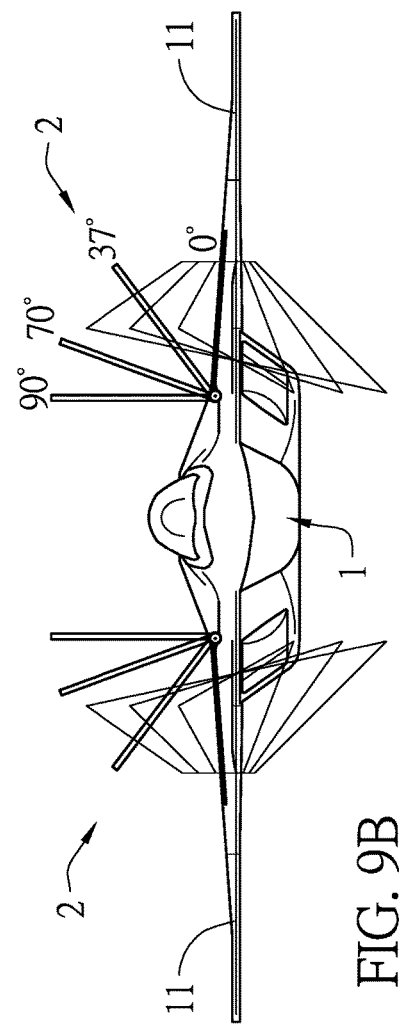
FIG. 9B
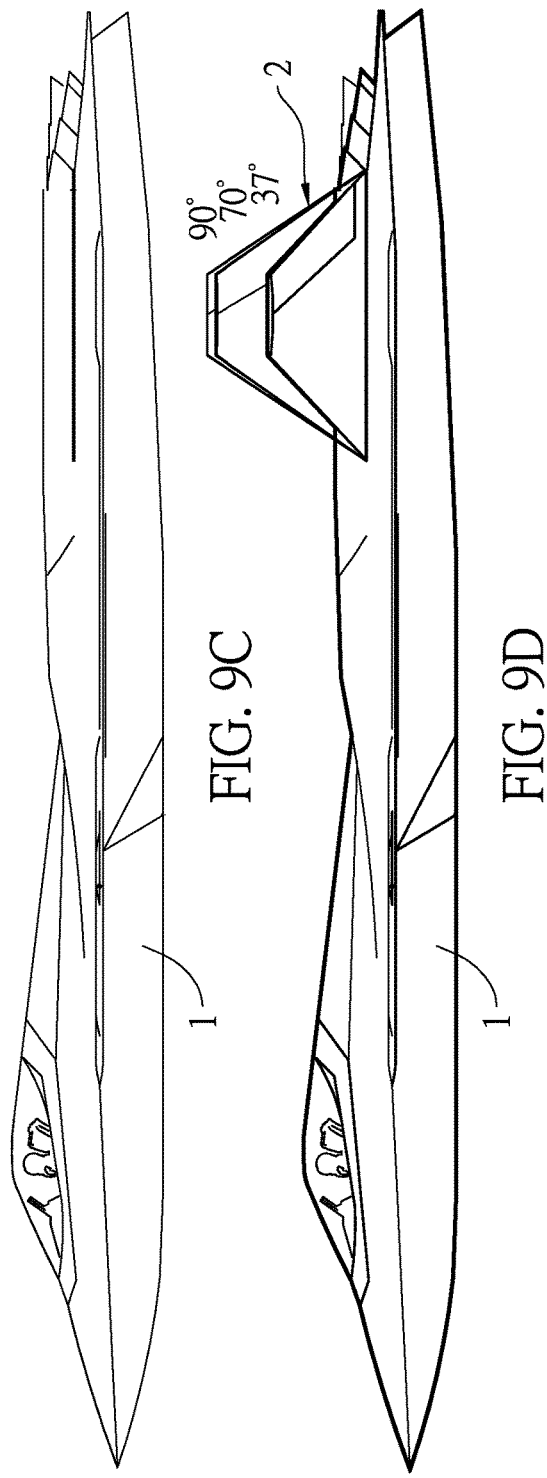
FIG. 9C
FIG. 9D

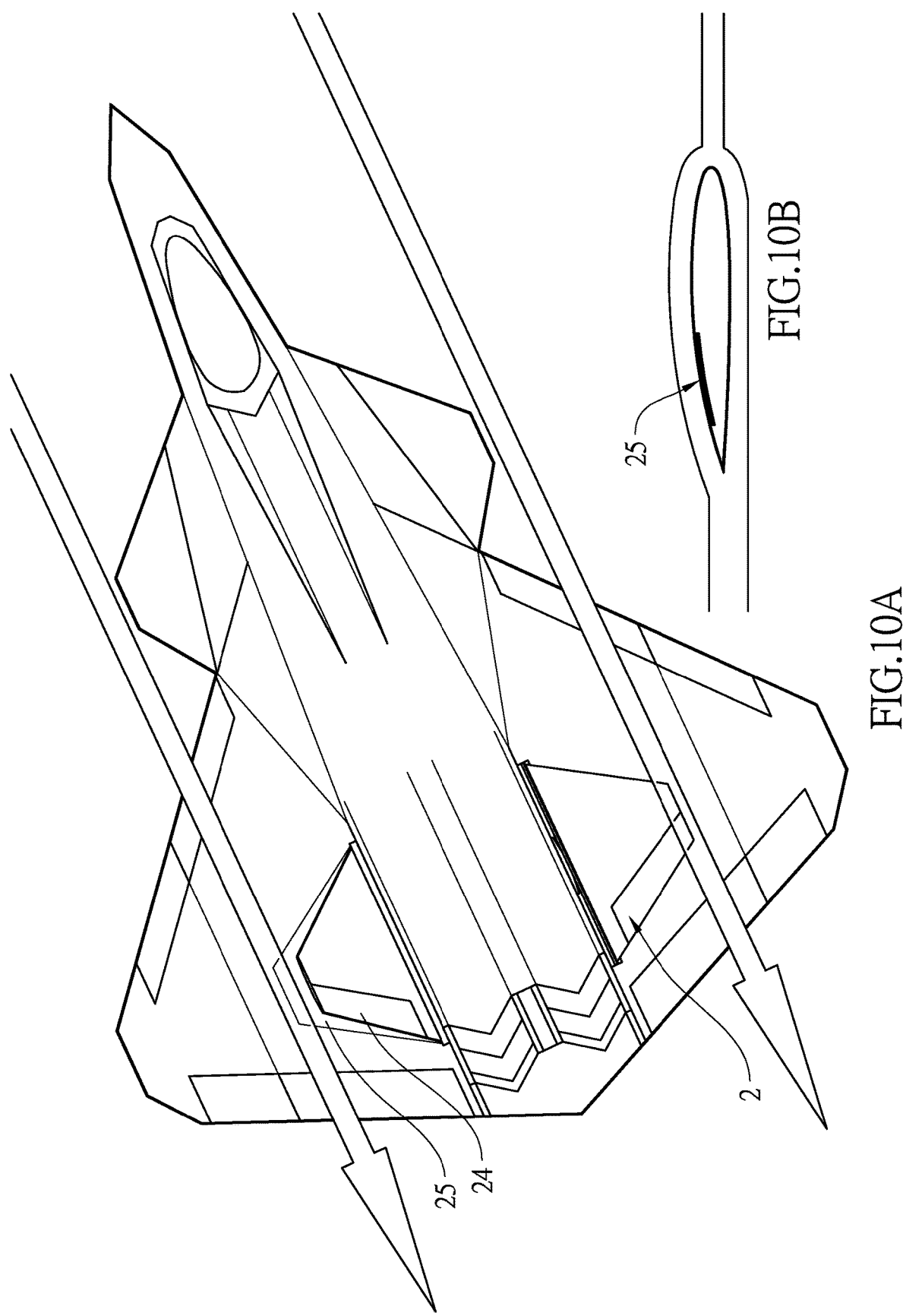

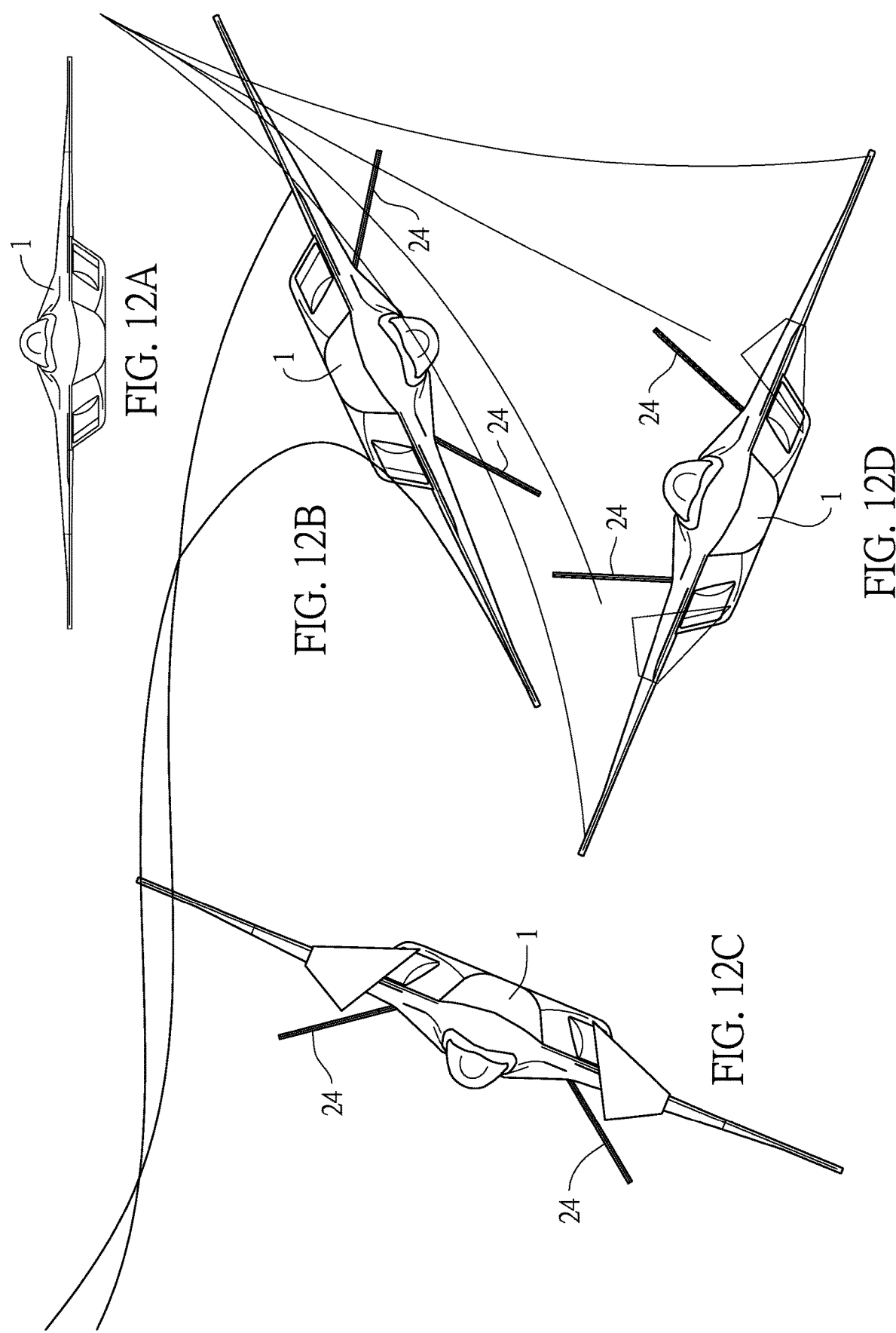

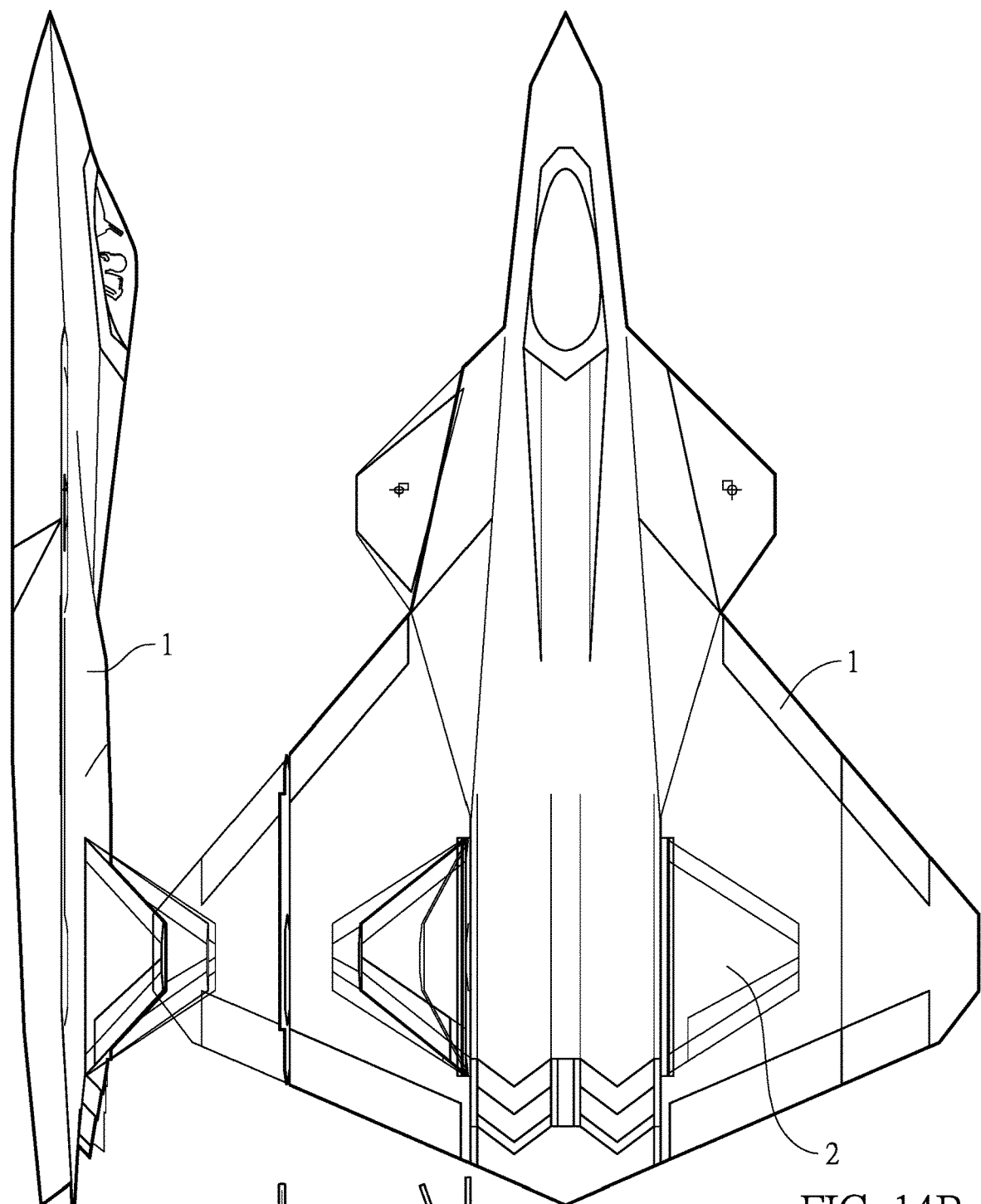
FIG. 14A
FIG. 14B
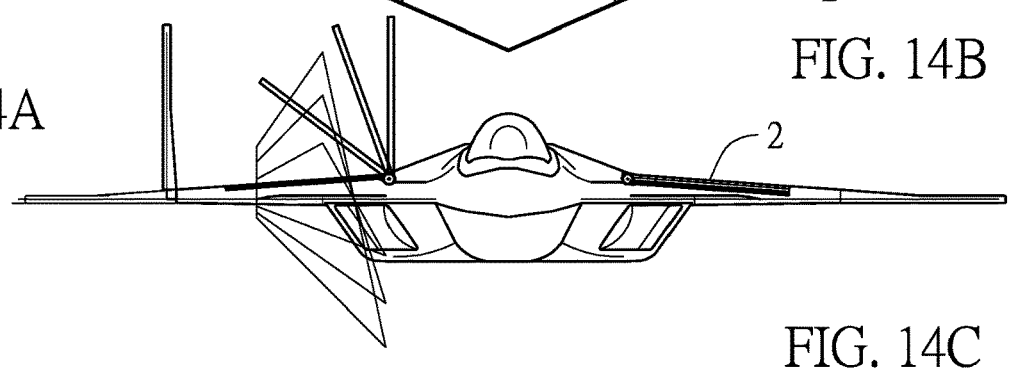
FIG. 14C

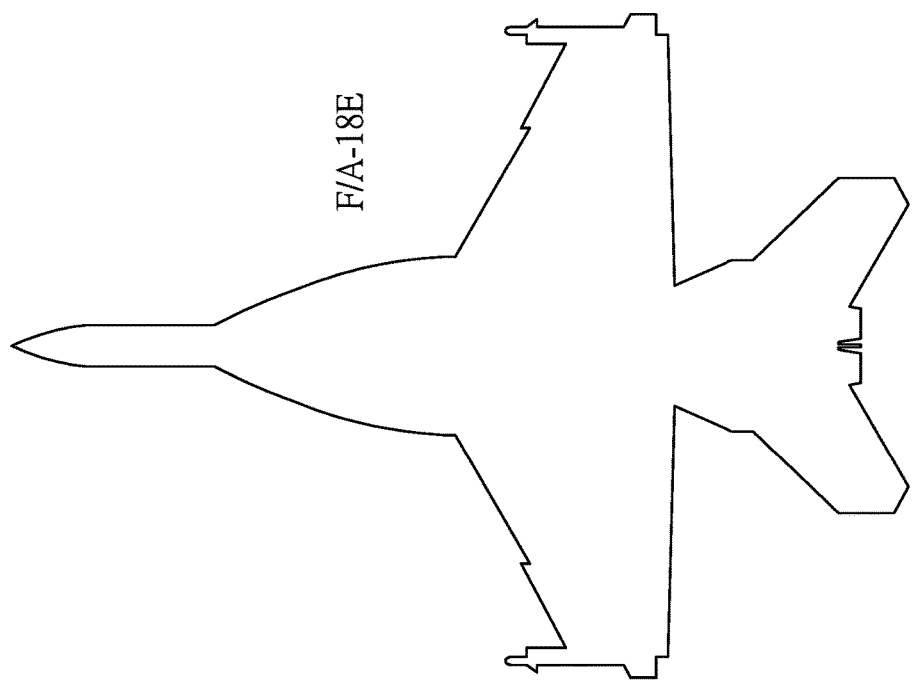
FIG. 15C
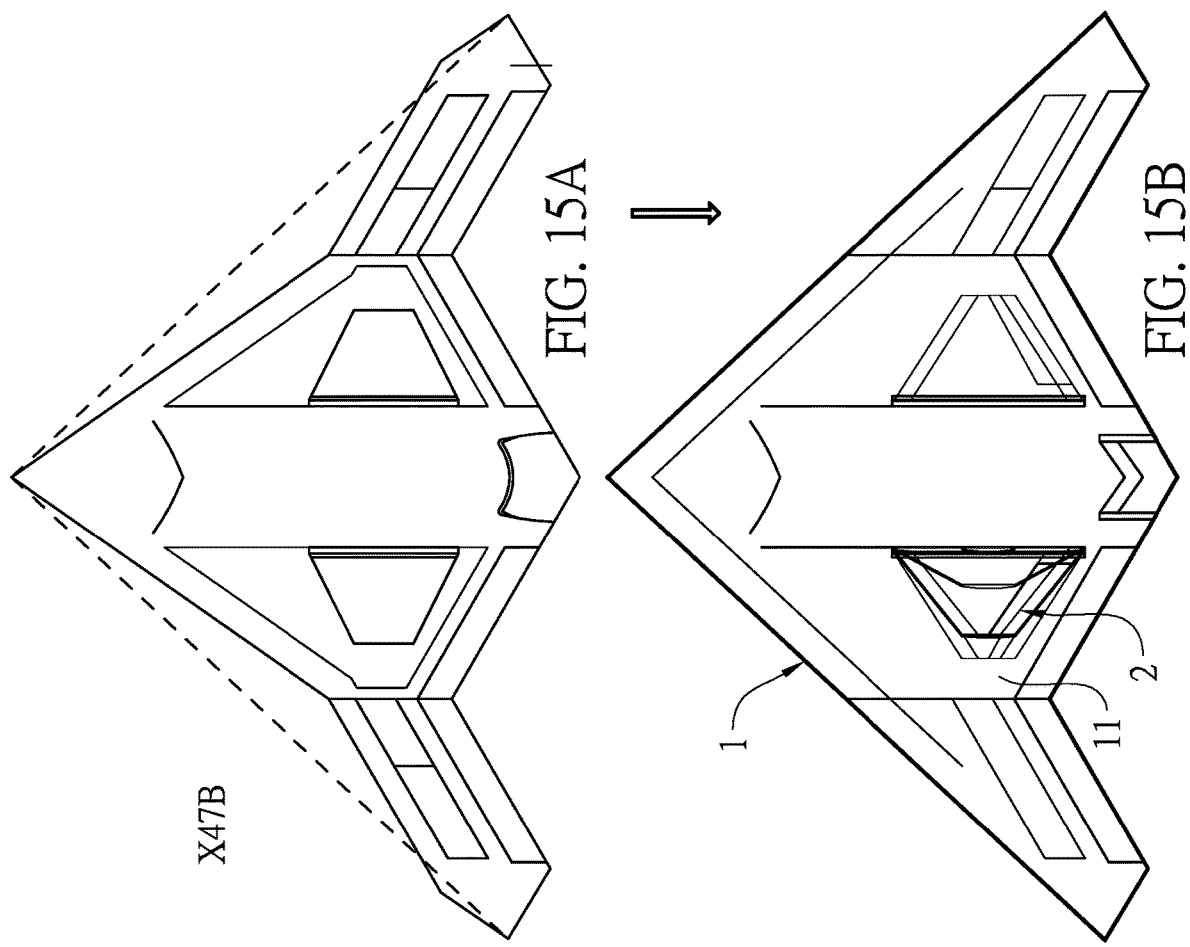
FIG. 15A  →  FIG. 15B

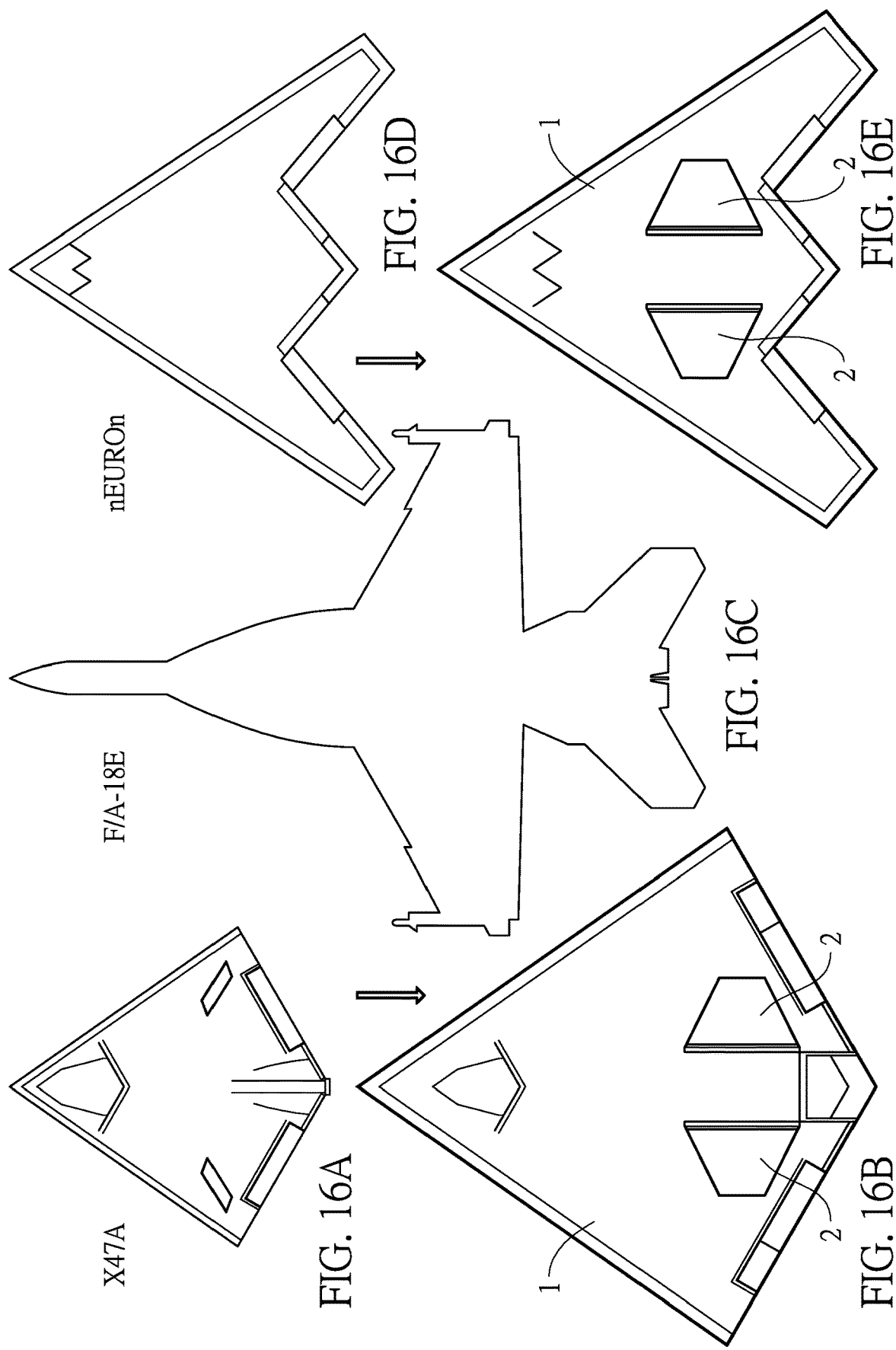

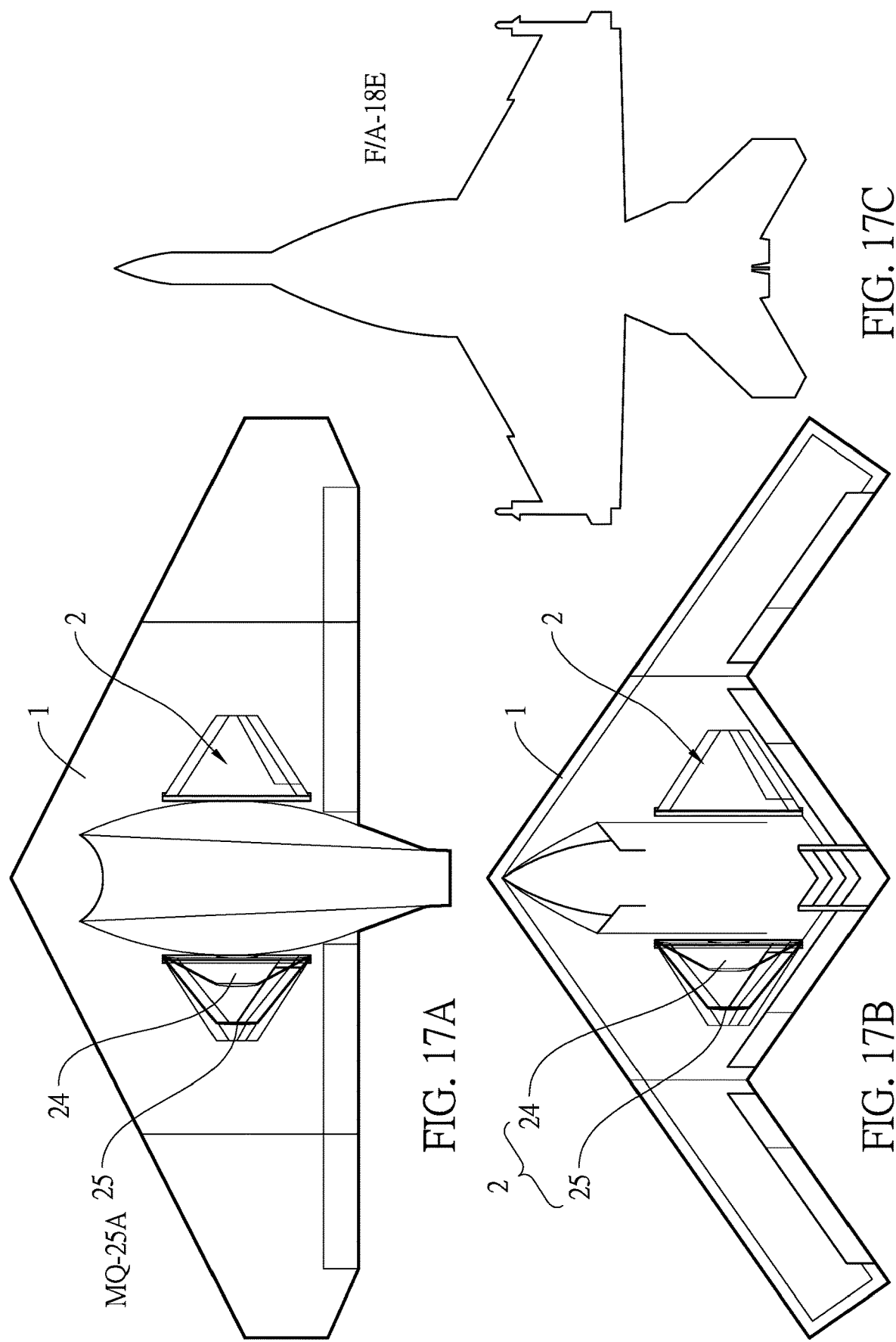

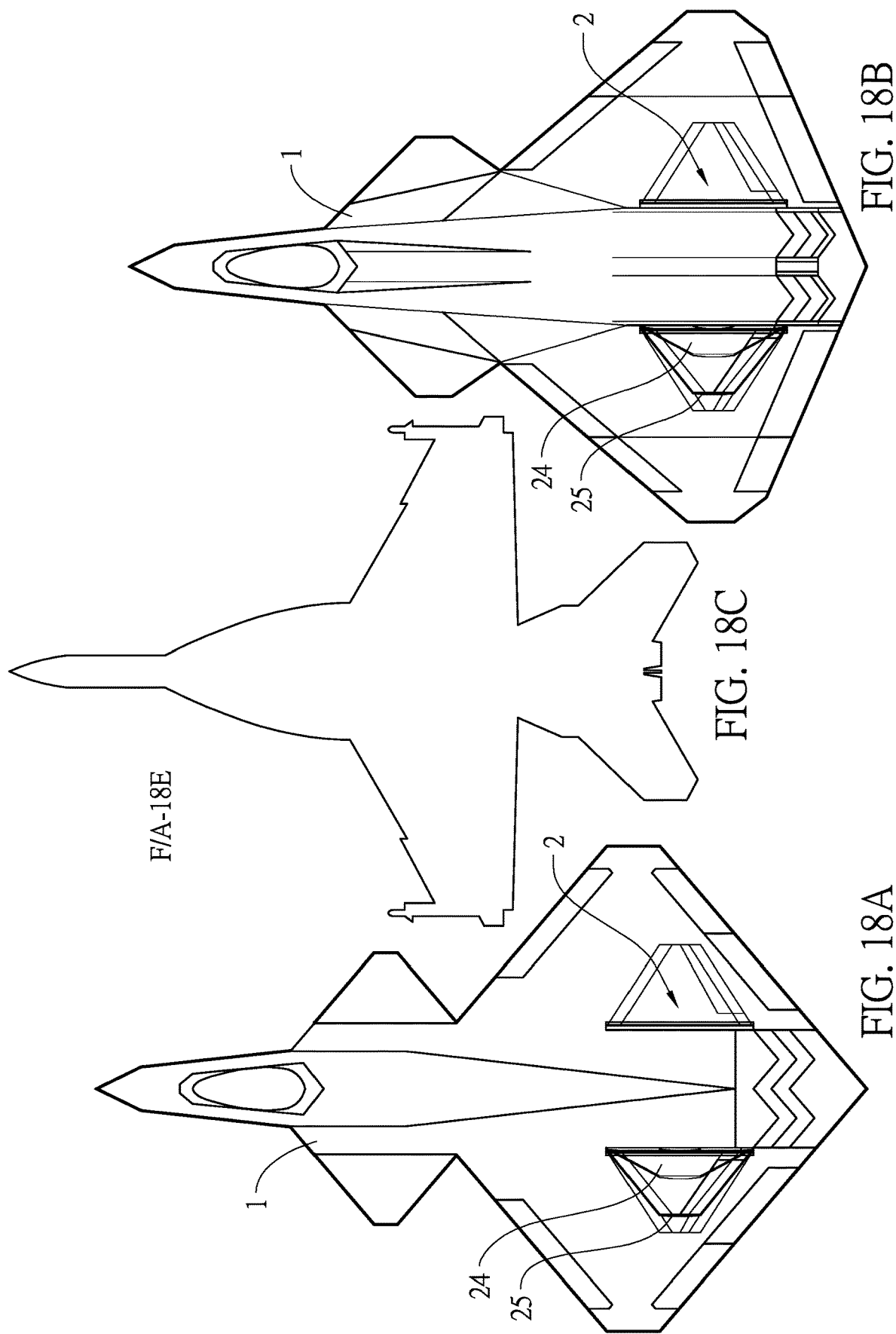

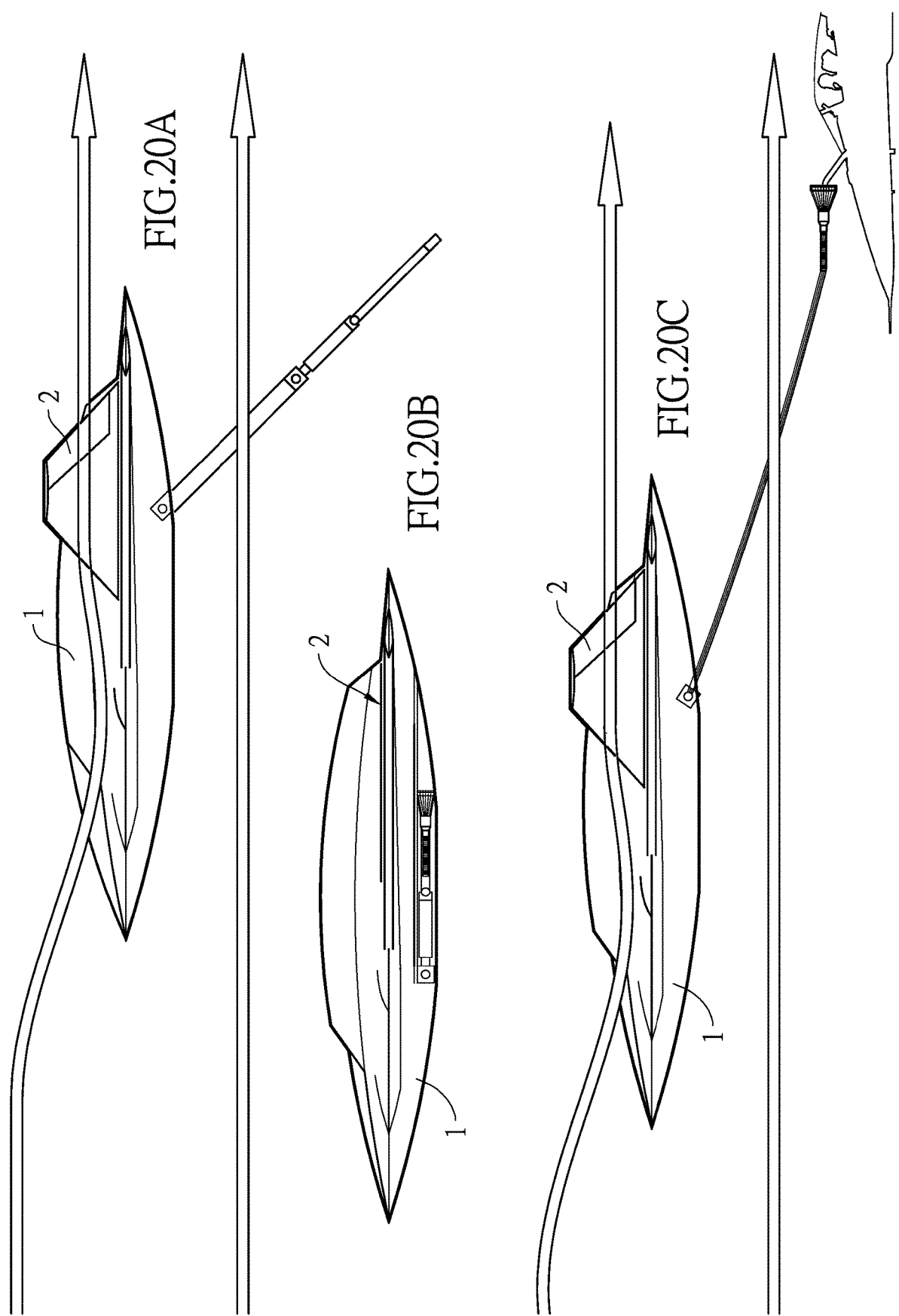

AIRCRAFT WITH STEALTH DOUBLE WINGS

BACKGROUND OF THE INVENTION

Field of Invention

The present invention is related to an aircraft with stealth double wings, capable of improving the radar-stealth effect, the smooth and rapid change of attitude flight control, and the flight safety, and especially suitable for Stealth Fighters, Stealth Bombers, Stealth Reconnaissances, Stealth Unmanned Aerial Vehicles (UAV), Stealth Tankers, and Stealth Attackers.

Prior Art

The most important function required for the next generation military aircrafts is the radar-stealth function. In order to achieve the medium and long range radar-stealth effect, various methods are adopted to reduce radar cross section (RCS) and radar echo. For stealth military aircrafts, in addition to the use of specific stealth coating coated on their main bodies to absorb radar waves, other designs such as flying wing or blended wing body also could be used for them. The most important design in view of overall appearance is the removal of vertical tails and horizontal tails of conventional aircrafts.

Such unique design, that is, the removal of vertical tails, would result in the disadvantage of unstable attitude flight control. Modern flight computers are capable of automatically overcoming the disadvantage of unstable attitude flight control. In other words, the problem regarding the design for the fighters can be solved by assistance of the flight computers. However, the removal of the vertical tails in accordance with the next generation radar-stealth demand would nevertheless substantially incur some disadvantages in flight, such as the difficulty in the rapid and smooth change of attitude flight control, the adverse influence on the movement of ultra-high-speed aircrafts, and the adverse influence on the fight with enemies and the adoption of countermeasures.

Therefore, the military aircrafts with flying-wing and tailless designs, such as the bombers of Northrop Grumman B-2 Spirit, reconnaissances of Lockheed Martin RQ-170 Sentinel, unmanned aerial vehicles of Northrop Grumman X-47B, can fly safely and smoothly only under good weather conditions. Thereby, an adverse effect is inevitably exerted on the carrying out of their missions and flight safety during bad weather conditions, for example, when military aircrafts launch an attack to enemies or carry out the taking-off from and landing onto an aircraft carrier.

However, stealth military aircrafts may have to carry out combat or other missions under adverse weather conditions. For example, they may have to carry out taking-off for air defense missions under bad weather conditions, may be forced to carry out landing under severe weather conditions when running out of fuel during routine cruise, may be damaged when encountering the interception of enemy aircrafts, the attack from anti-aircraft missiles, or even the attack from anti-aircraft cannons.

Since the sixth generation stealth fighters under designing are not provided with vertical tails, in the aspect of flight control, their flight direction can be adjusted only by means of the thrust vectoring of thrust vector nozzles together with the rising of two spoilers arranged on their wings. Consequently, in comparison with the fifth generation stealth fighters, they are less flexible. Moreover, the deflection of the spoilers is not suitable for high-speed flight. Accordingly, in real combat, the sixth generation stealth fighters would have restricted movement and poor agility, or even are susceptible to be shot down or have other flight risks.

SUMMARY OF THE INVENTION

Therefore, the present invention is aimed at making improvements to overcome the shortcomings mentioned above and to enhance flight safety.

An object of the present invention is to provide an aircraft with stealth double wings capable of improving the radar-stealth effect, the smooth and rapid change of attitude flight control, and the flight safety.

In order to achieve the above-mentioned object, the present invention provides an aircraft with stealth double wings, which comprises a main body and stealth double wings. The main body has two sides that are respectively provided with a main wing having a surface into which a space is formed. Each of the stealth double wings is located respectively in the space of the main wing and includes a first rotating shaft, a second rotating shaft, a link rod, a first wing (provided with the function of a vertical tail and partial function of the main wing), and a second wing (provided with partial function of the main wing). The link rod has two ends respectively in connection with the first rotating shaft and the second rotating shaft. The first rotating shaft has one end in connection with the first wing, while the second rotating shaft has one end in connection with the second wing.

Thereby, when the first wing is moved to cover and enclose the space's opening, the second wing is driven by the first rotating shaft and the second rotating shaft to be located within the space; when the first wing is moved upwardly away from the space at an angle with respect to the main wing to perform a vertical tail's function, the second wing is driven by the first rotating shaft and the second rotating shaft to cover and enclose the space's opening. In this way, raising the first wing upwardly as a vertical tail would provide the stealth aircraft with enhanced controllability and stable safety so that specified actions could be performed. Moreover, raising the second wing or lowering the first wing would keep intact the surface of the main wing, so as to maintain the original buoyancy conforming to fluid mechanics.

In implementation, the first rotating shaft and the second rotating shaft of each of the stealth double wings are controlled via a controlling system so as to drive the first wing and the second wing to displace.

In implementation, a protruding part is provided on an internal wall of the space of the main wing and the protruding part is capable of being attached onto the first wing's end-face.

In implementation, the second wing has one end-face provided with a recessed part engageable with the protruding part on the internal wall of the main wing, so that when the second wing is upwardly moved to the surface of the main wing, it is stopped by the protruding part and evenly covers the space of the main wing.

The present invention will become more fully understood by reference to the following detailed description thereof when read in conjunction with the attached drawings.

BRIEF DESCRIPTION OF THE DRAWINGS

FIG. 3A is a frontal view showing that the stealth double wings are raised at an angle of 37 degrees.

FIG. 3B is a left side view showing that the stealth double wings are raised at the angle of 37 degrees.

FIG. 3C is a left frontal cross-sectional view showing that the stealth double wings are raised at the angle of 37 degrees.

FIG. 3D is a partially enlarged cross-sectional view of FIG. 3C.

FIG. 8A is a frontal view showing a stealth fighter with stealth double wings raised at an angle of 70 degrees.

FIG. 8B is a left side view showing the fighter in FIG. 8A.

FIG. 8C is a frontal view showing a fighter with stealth double wings folded at an angle of 90 degrees.

FIG. 8D is a left side view showing the fighter in FIG. 8C.

FIG. 9A is a frontal schematic view showing a fighter.

FIG. 9B is a schematic view showing four angles at which first wings of the fighter in FIG. 9A are raised.

FIG. 9C is a left side view showing a fighter.

FIG. 9D is a schematic view showing four angles at which first wings of the fighter in FIG. 9C are raised.

FIG. 10A is a top view showing the airflow passing by a stealth fighter.

FIG. 10B is a cross-sectional view showing the main wing passing through the airflow after the stealth double wings are folded.

FIGS. 12A to 12D are schematic views showing various combat flights of a stealth fighter with the stealth double wings raised.

FIGS. 14A to 14C are respectively a left side view, a top view, and a frontal view of a sixth generation stealth fighter with stealth double wings, where it has fordable first wings that are shown at three angles and has a wing width the same with that of Boeing F/A-18E used by United States Navy.

FIGS. 15A to 15C are respectively a top view showing an unmanned aerial vehicle, Northrop Grumman X-47B (upper left), a top view showing a stealth fighter with improved stealth double wings (lower left), and a view showing the contour of Boeing F/A-18E (drawn to the same scale) used by United States Navy (right) for comparison.

FIGS. 16A to 16C are top views respectively showing the modular stealth double wings designed for an arrow-shaped unmanned aerial vehicle, Northrop Grumman X-47A (upper), and for an application to a larger-scale aircraft (lower), and showing the contour of Boeing F/A-18E (drawn to the same scale) used by United States Navy (middle) for comparison.

FIGS. 16D to 16E are top views respectively showing an unmanned aerial vehicle, Dassault nEUROn (upper), and an application of the stealth double wings to a larger-scale aircraft (lower).

FIGS. 17A to 17C are top views respectively showing the modular stealth double wings designed for a tanker, Lockheed Martin MQ-25A Stingray with unmanned carrier aviation air system (UCAAS) (upper left), and for a tanker with flying wing (lower left), and showing the contour of Boeing F/A-18E (drawn to the same scale) used by United States Navy (right) for comparison.

FIGS. 18A to 18C are top views respectively showing the modular stealth double wings for different sixth generation stealth fighters (left and right) and showing the contour of Boeing F/A-18E (drawn to the same scale) used by United States Navy (middle) for comparison.

FIG. 20A is a left side view showing a stealth unmanned tanker with Probe-and-drogue system.

FIG. 20B is a left side view showing the stealth unmanned tanker with the stealth double wings folded.

FIG. 20C is a left view showing the stealth unmanned tanker with Grappled-line looped-hose.

DETAILED DESCRIPTION OF THE INVENTION

Figure 1A:
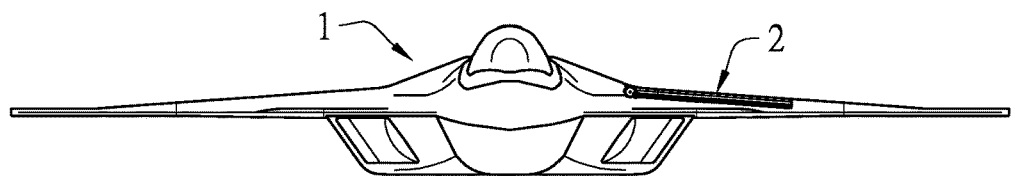
FIGS. 1A to 1E are schematic views showing the stealth double wings used for stealth fighters according to the present invention, where the stealth double wings are raised at following angles: 0, 37, 70, and 90 degrees.
Figure 1B:
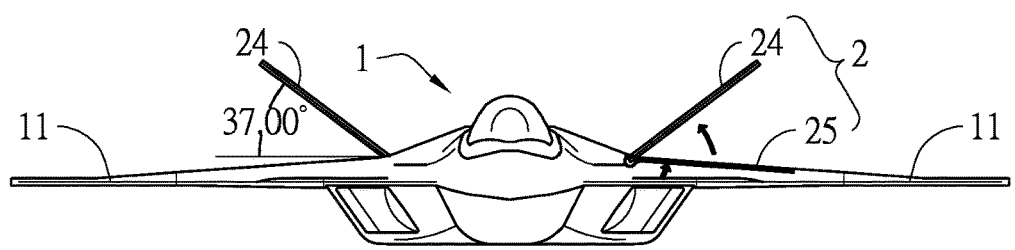
Figure 1C:
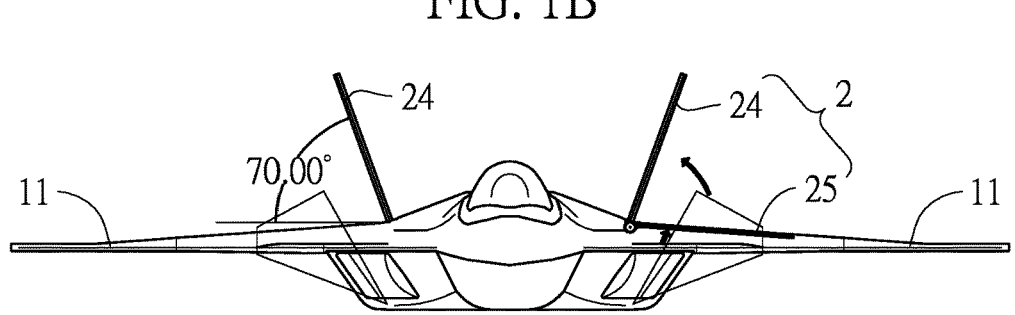
Figure 1D:
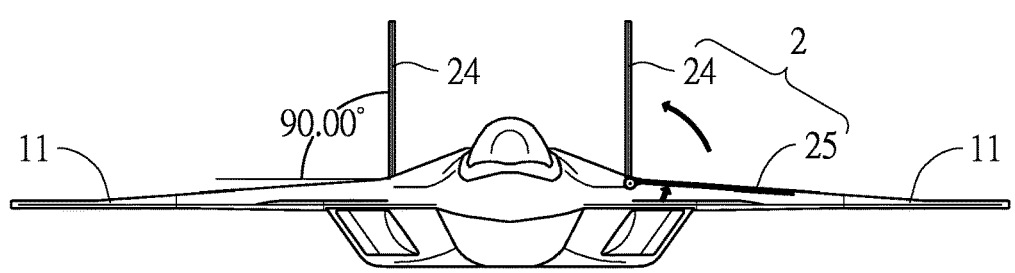
Figure 1E:
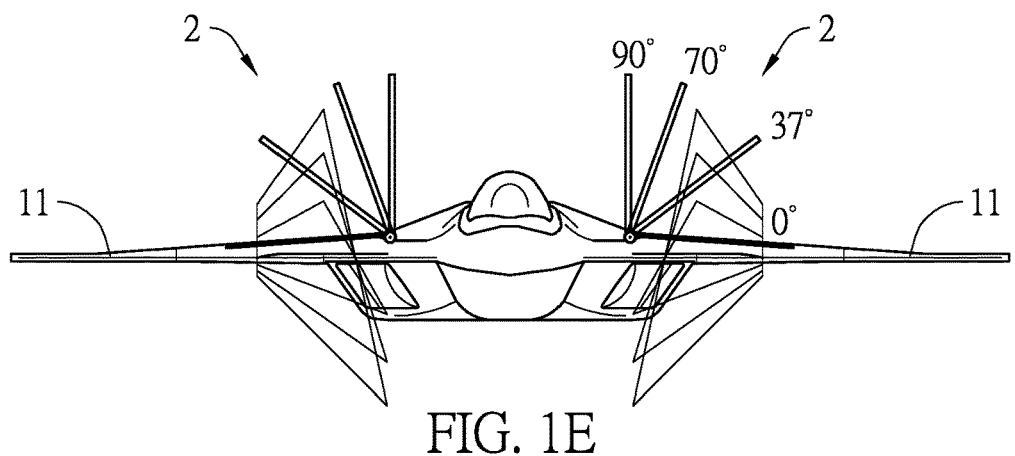

Please refer to FIGS. 1A to 6B, which show one embodiment of an aircraft with stealth double wings according to the present invention. The aircraft comprises a main body 1 and stealth double wings 2.

The main body 1 has two sides that are respectively provided with a main wing 11 having a surface into which a space 12 is formed. A protruding part 111 is provided on an internal wall of the space 12 of the main wing 11.

Figure 2A:
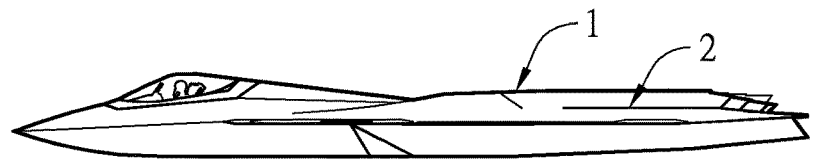
FIG. 2A is a left side view showing a stealth fighter not provided with vertical tails.
Figure 2B:
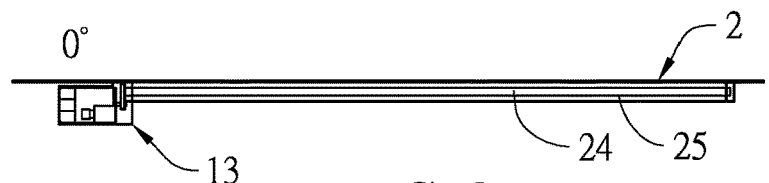
FIG. 2B is a lateral side view showing the folded state of the stealth fighter in FIG. 2A.
Figure 2C:
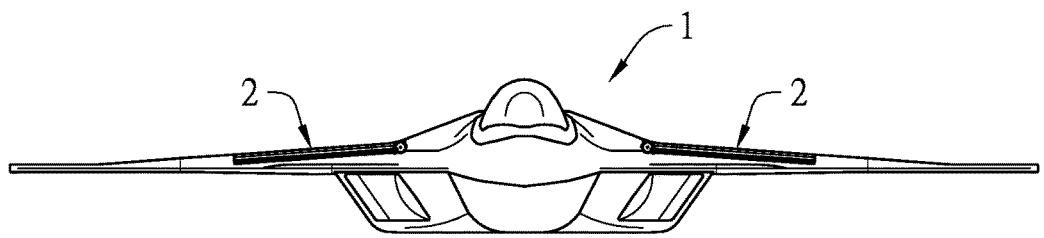
FIG. 2C is a frontal view showing a stealth fighter with stealth double wings folded at an angle of 0 degree.
Figure 2D:
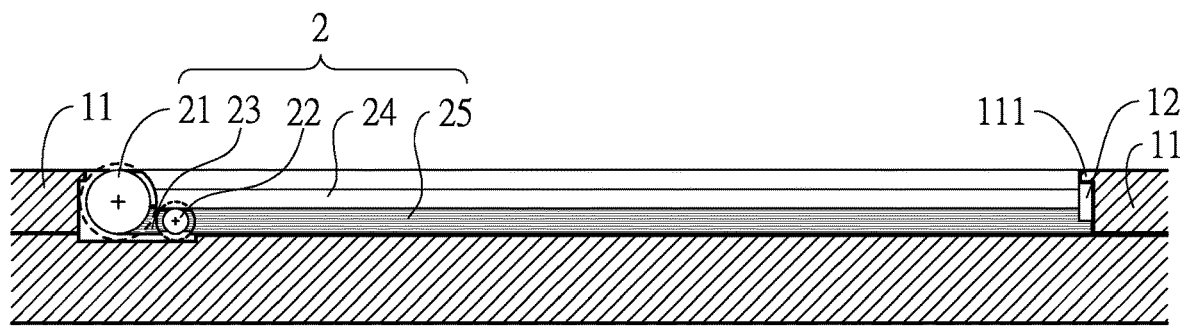
FIG. 2D is a frontal cross-sectional view of FIG. 2C.
Figure 2E:
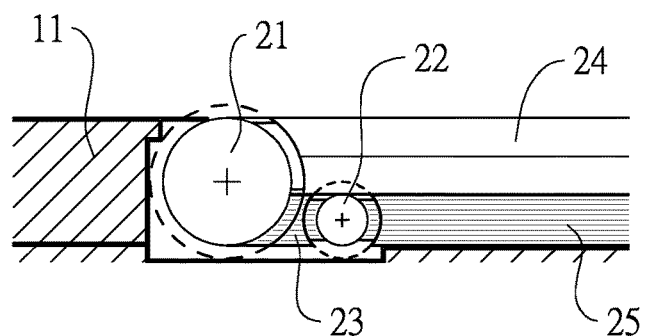
FIG. 2E is a partially enlarged cross-sectional view of FIG. 2D.
Figure 4B:
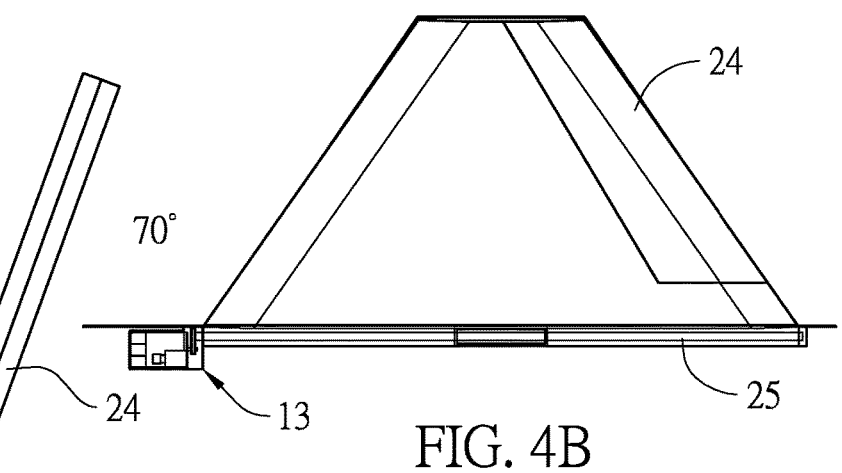
FIG. 4B is a left side view showing that the stealth double wings are raised at the angle of 70 degrees.
Figure 4A:
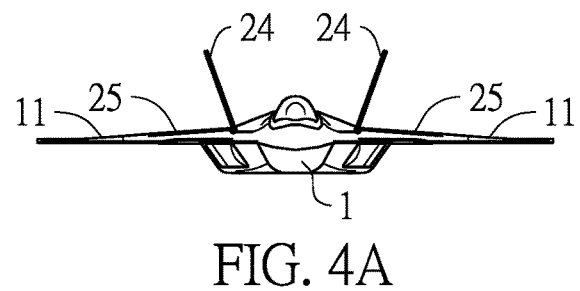
FIG. 4A is a frontal view showing that the stealth double wings are raised at an angle of 70 degrees.
Figure 4C:
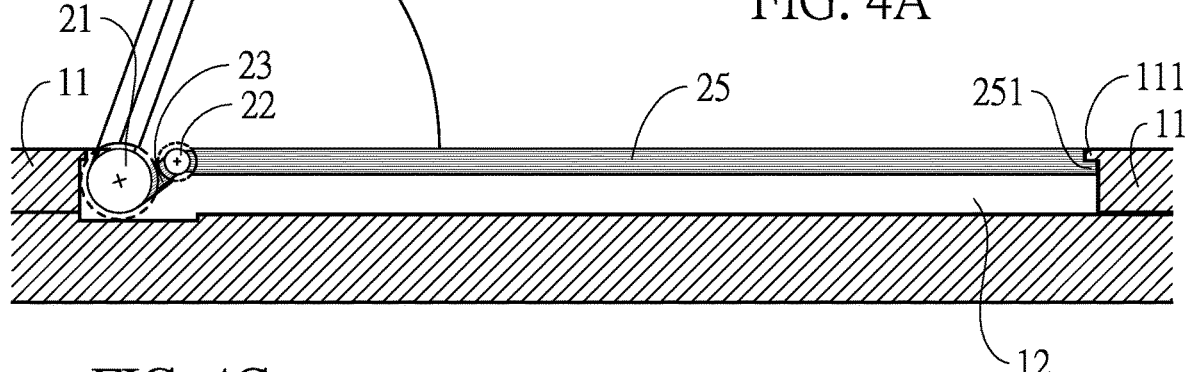
FIG. 4C is a left frontal cross-sectional view showing that the stealth double wings are raised at the angle of 70 degrees.
Figure 4D:
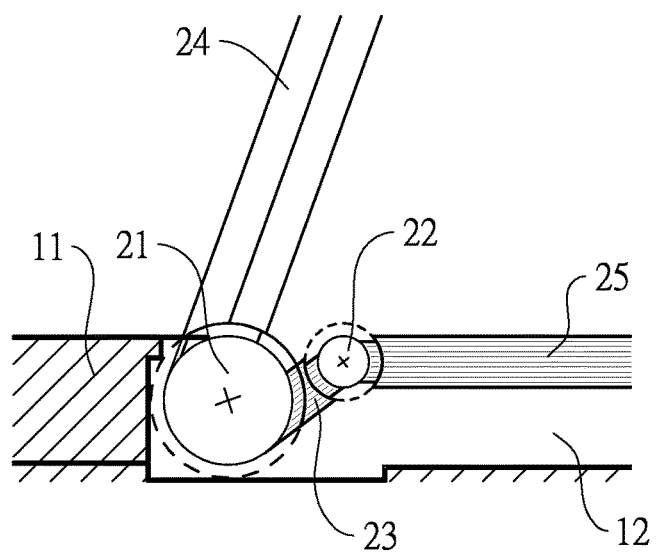
FIG. 4D is a partially enlarged cross-sectional view of FIG. 4C.
Figure 5B:
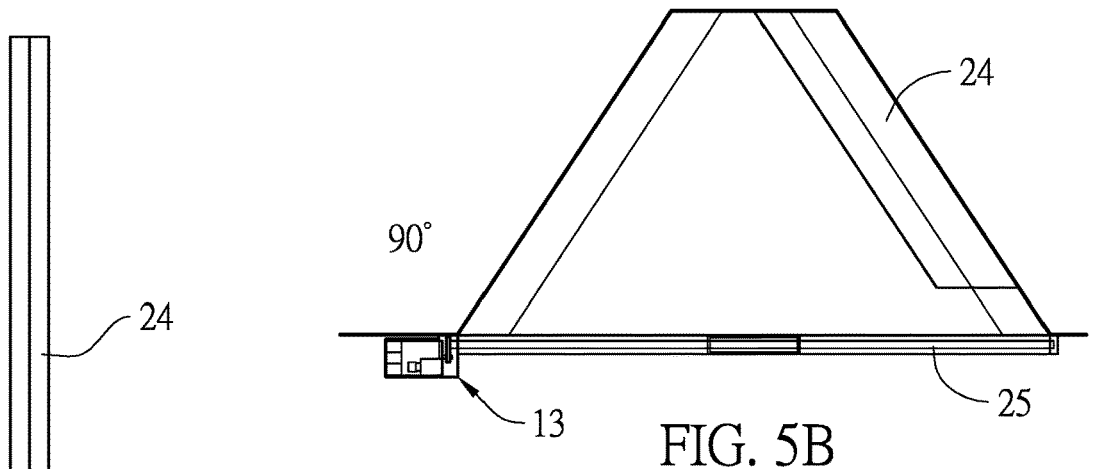
FIG. 5B is a left side view showing that the stealth double wings are raised at the angle of 90 degrees.
Figure 5A:
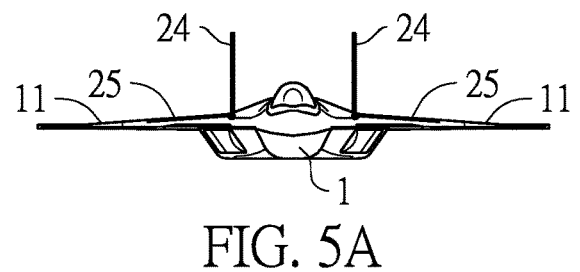
FIG. 5A is a frontal view showing that the stealth double wings are raised at an angle of 90 degrees.
Figure 5C:
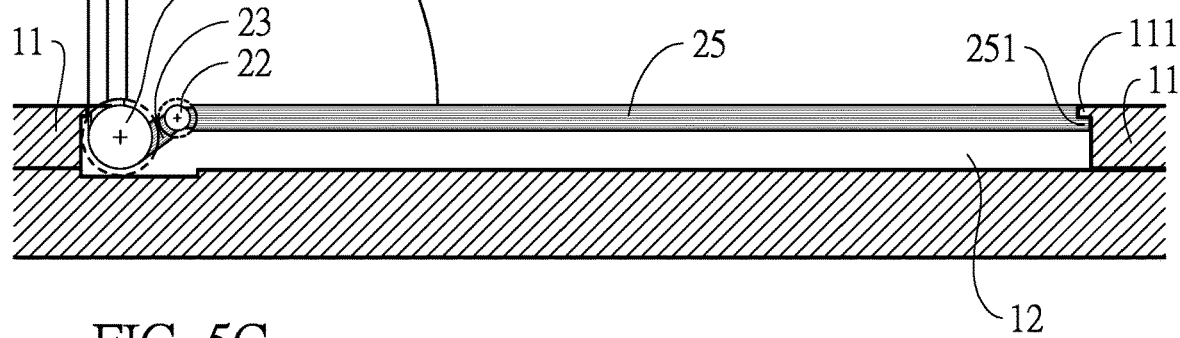
FIG. 5C is a left frontal cross-sectional view showing that the stealth double wings are raised at the angle of 90 degrees.
Figure 5D:
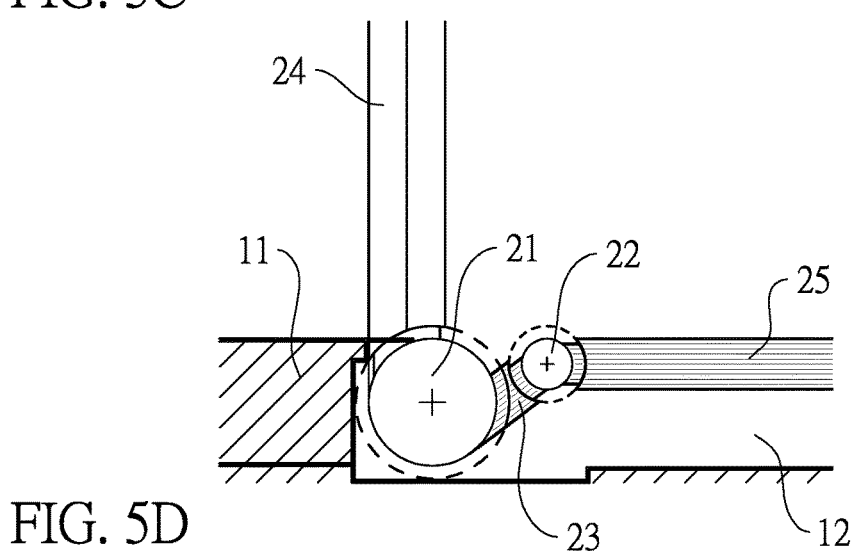
FIG. 5D is a partially enlarged cross-sectional view of FIG. 5C.
Figure 6A:
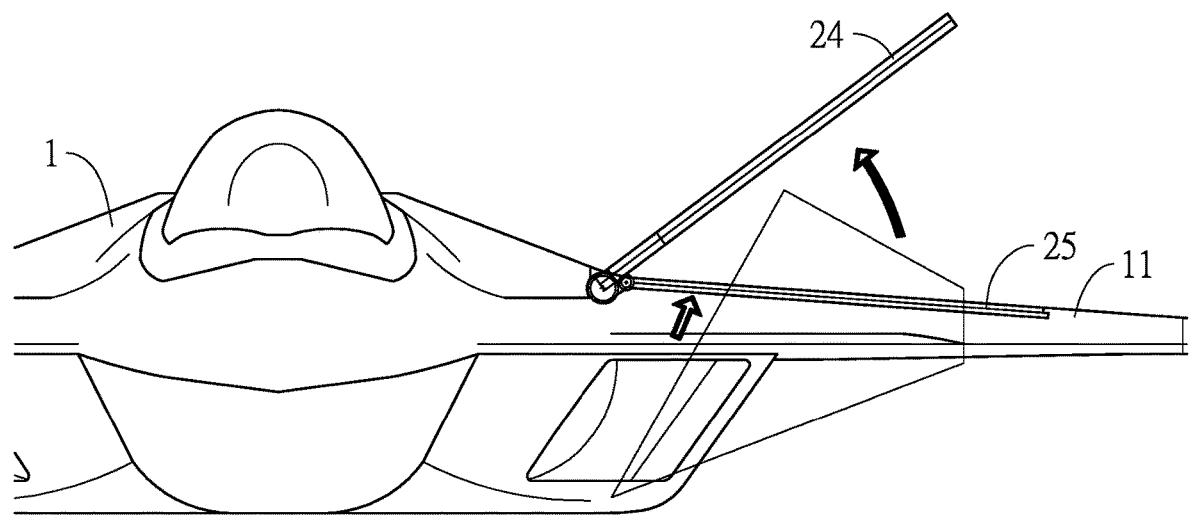
FIG. 6A is a left frontal schematic view showing that the stealth double wings of oblique wings are raised.
Figure 6B:
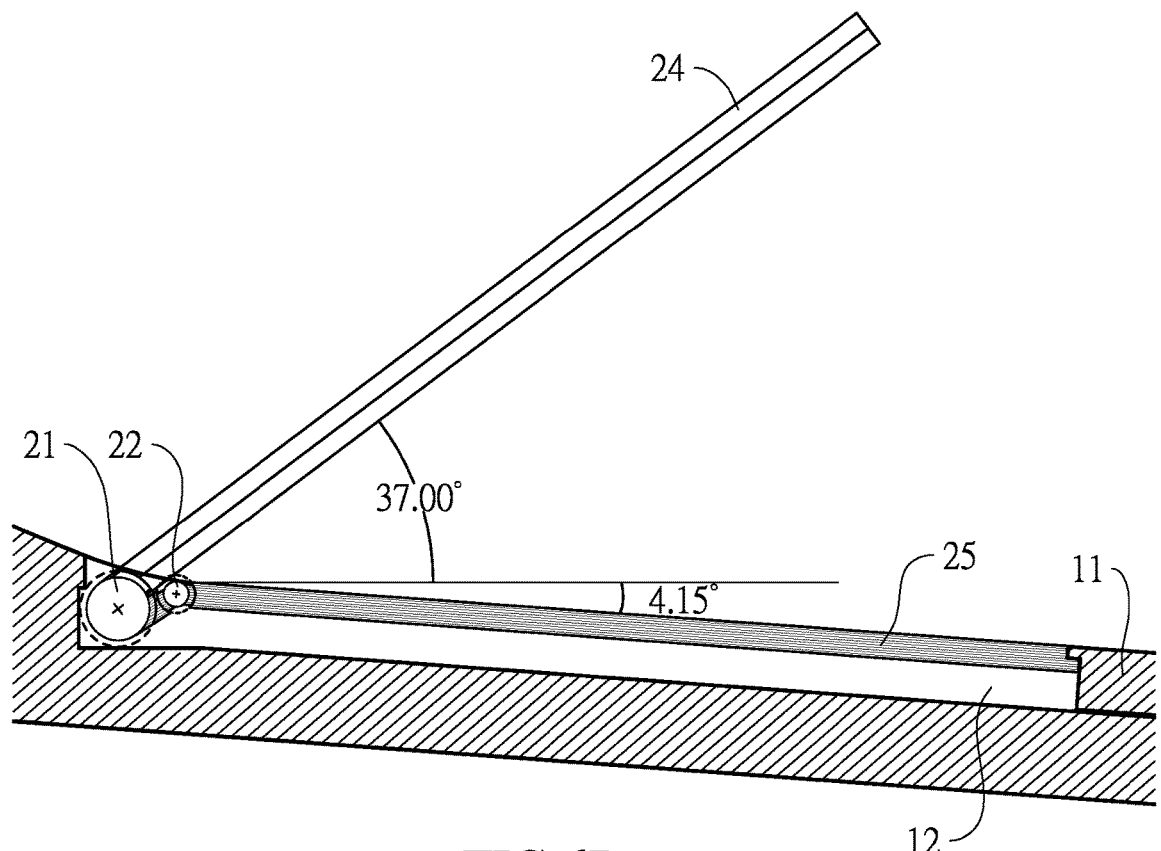
FIG. 6B is a left frontal cross-sectional view showing that the stealth double wings of oblique wings are raised.
Figure 7A:
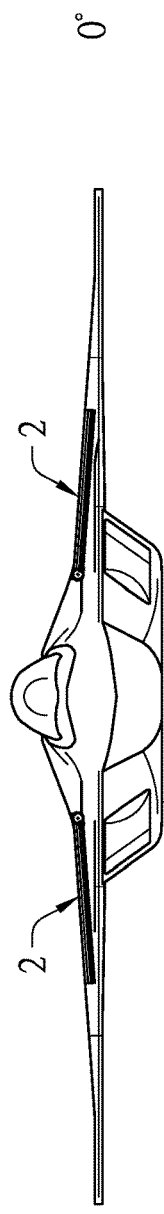
FIG. 7A is a frontal view showing a stealth fighter with stealth double wings folded at an angle of 0 degree.
Figure 7B:
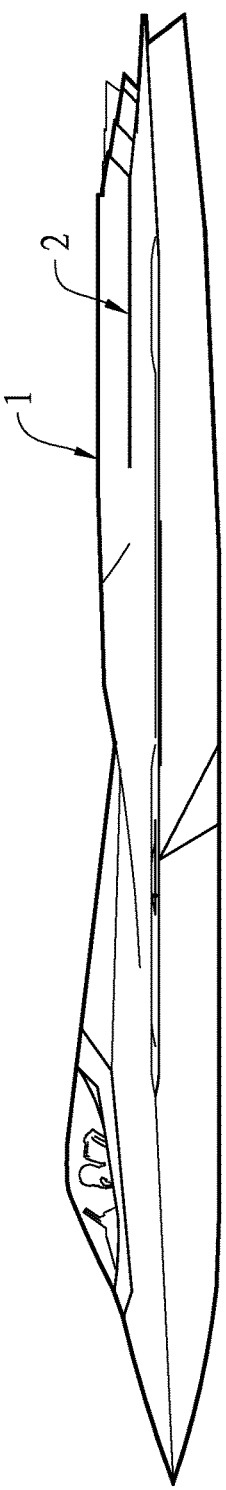
FIG. 7B is a left side view showing the fighter in FIG. 7A.
Figure 7C:
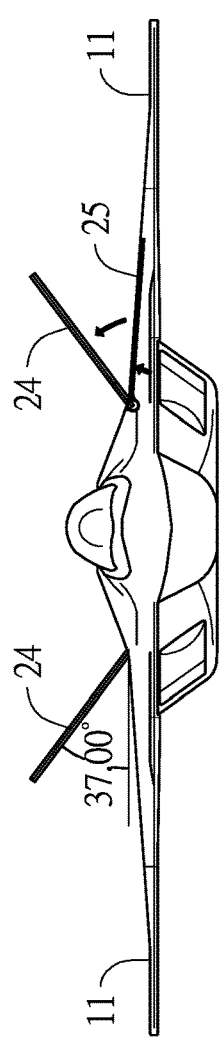
FIG. 7C is a frontal view showing a fighter with stealth double wings raised at an angle of 37 degrees.
Figure 7D:
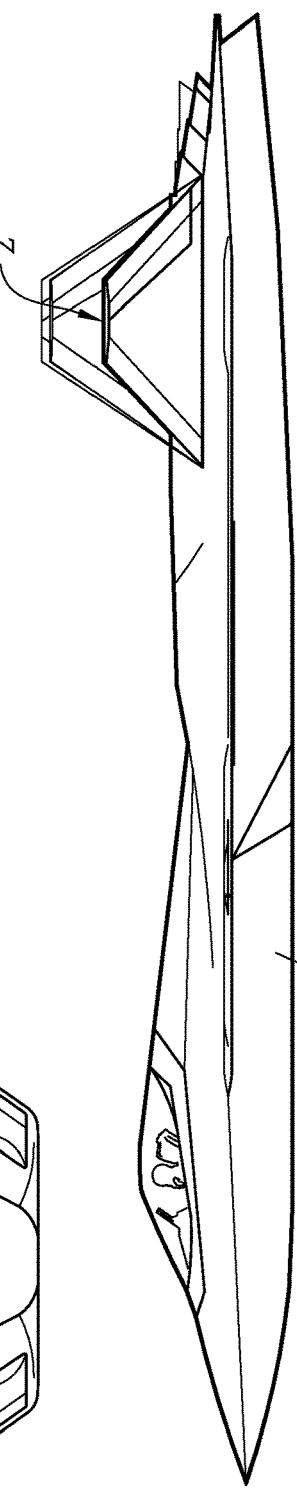
FIG. 7D is a left side view showing the fighter in FIG. 7C.
Figures 11A, 11B:
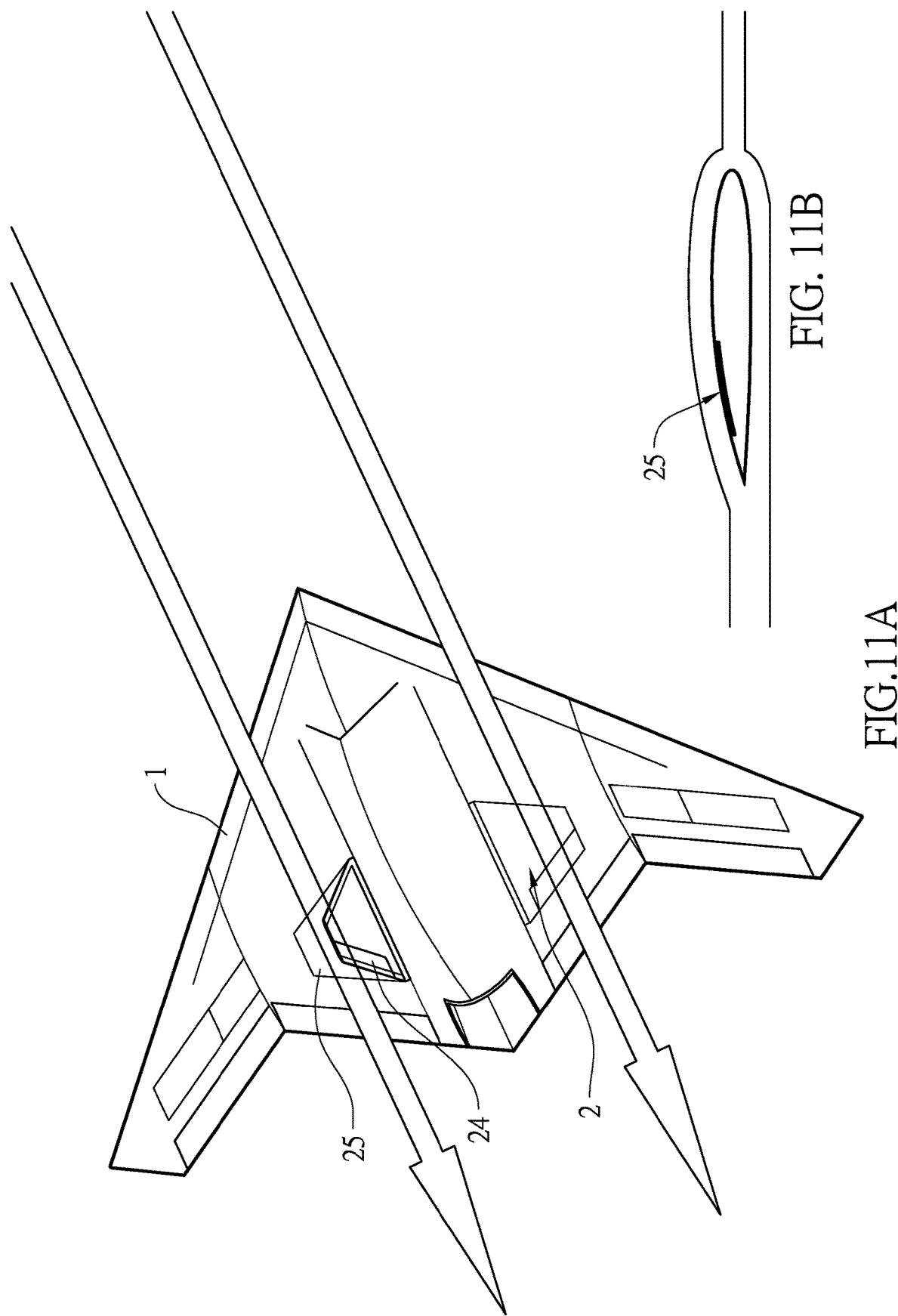
FIG. 11A is a top view showing the airflow passing by a stealth delta-winged unmanned aerial vehicle.
FIG. 11B is a cross-sectional view showing the main wing passing through the airflow after the stealth double wings are folded.
Figure 13:
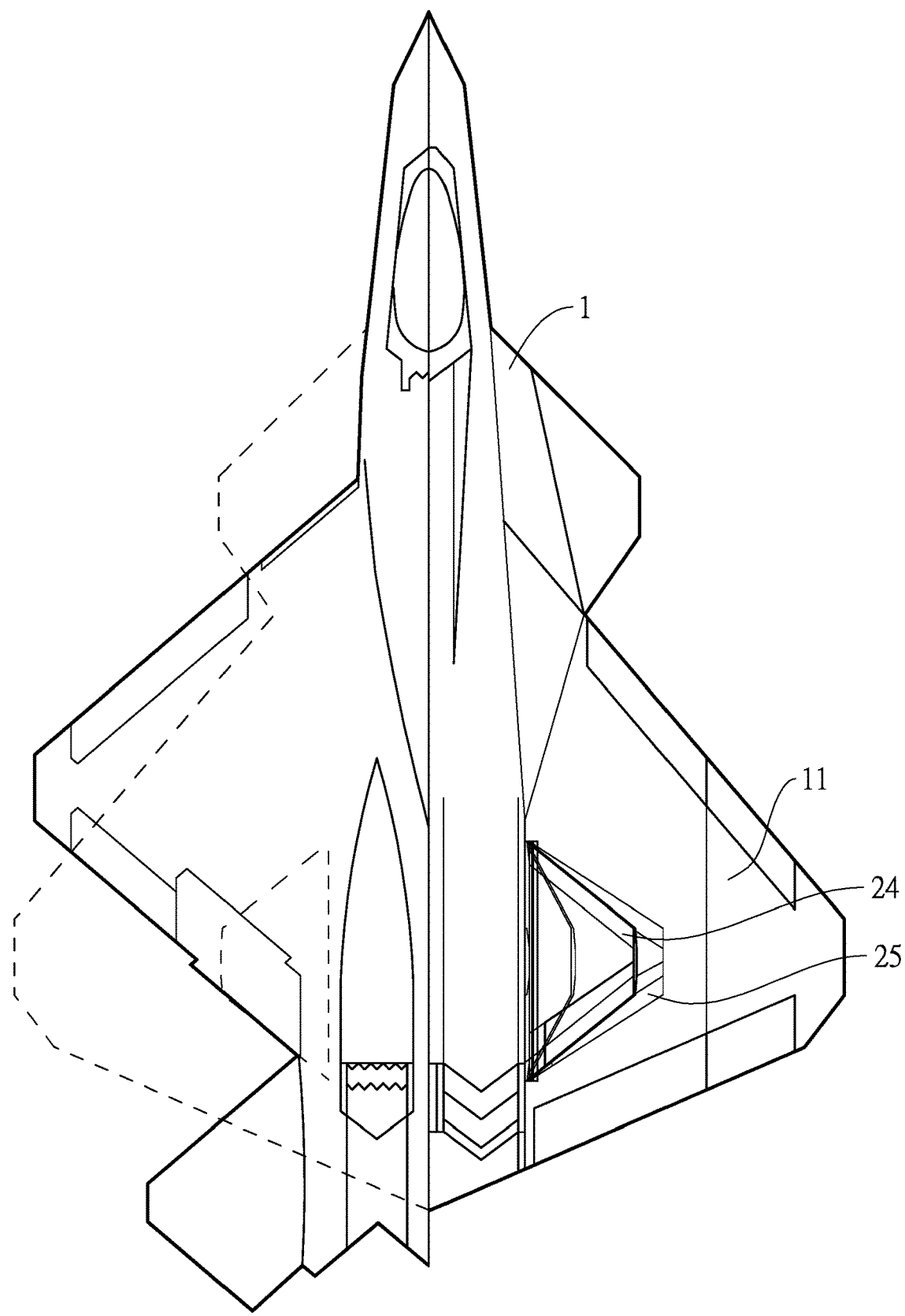
FIG. 13 is a schematic view showing a fifth generation stealth fighter, Northrop YF-23 (upper left) in comparison with a sixth generation stealth fighter with stealth double wings (right).
Figure 19A:
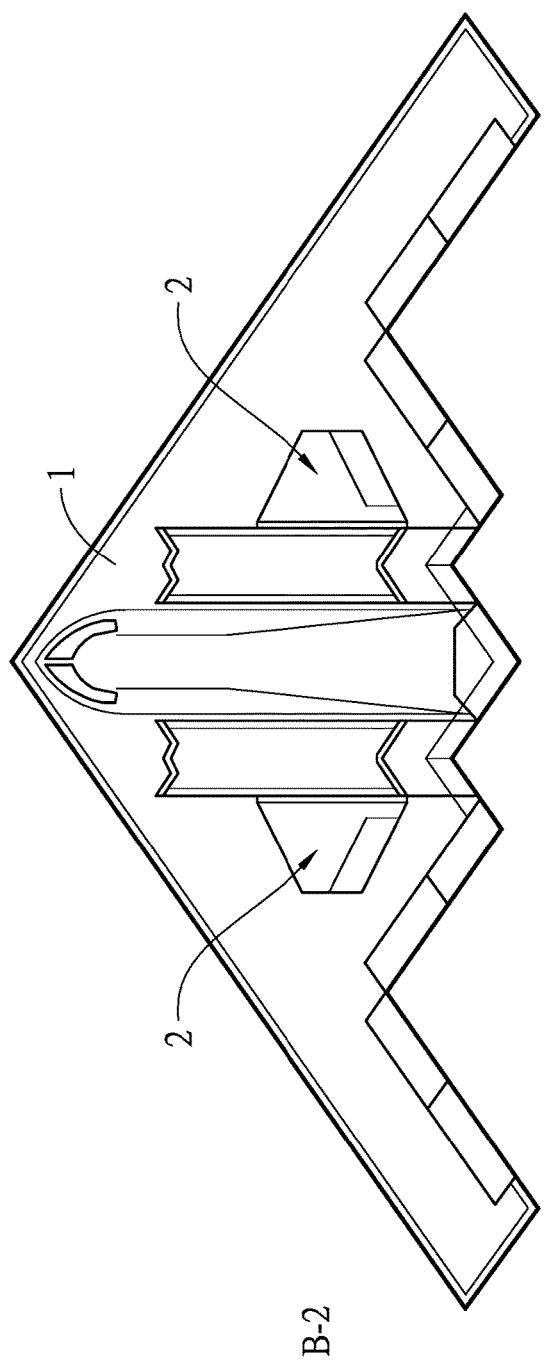
FIGS. 19A to 19C are top views respectively showing the modular stealth double wings for B-2 Bomber (upper), B-21 Bomber (lower), and showing the contour of Boeing F/A-18E (drawn to the same scale) used by United States Navy (lower right) for comparison.
Figure 19B:
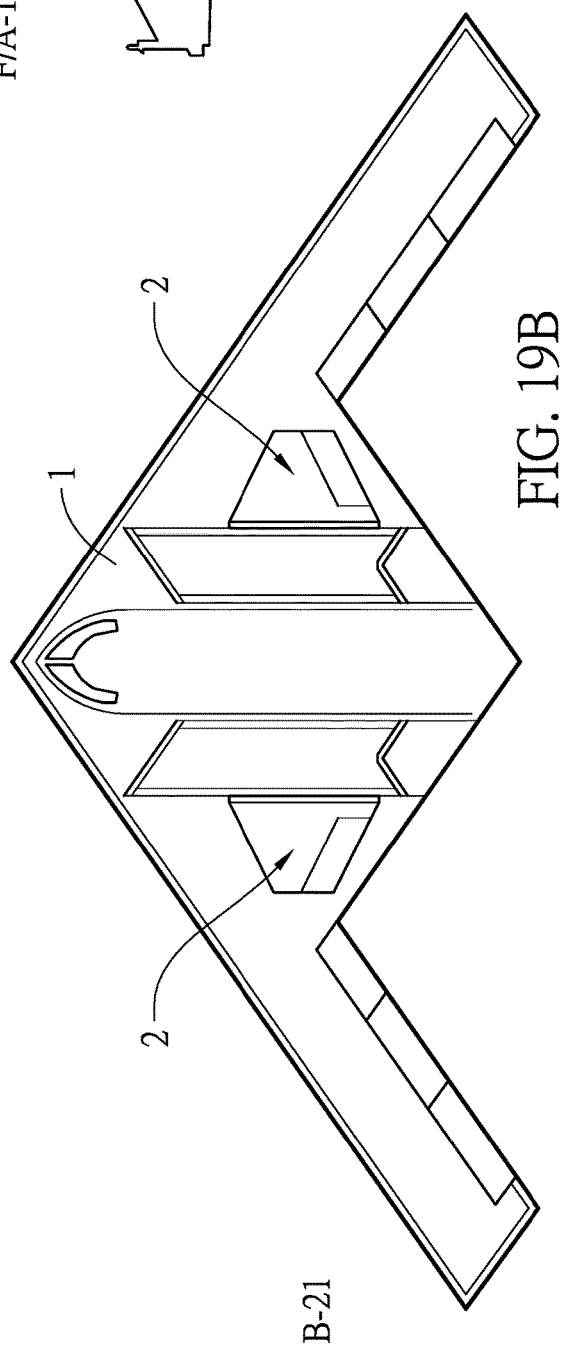
Figure 19C:
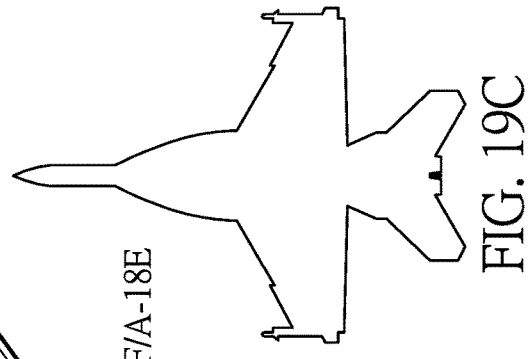

The stealth double wings 2 are located respectively in the space 12 of each main wing 11 and include a first rotating shaft 21, a second rotating shaft 22, a link rod 23, a first wing 24, and a second wing 25. The link rod 23 has two ends respectively in connection with the first rotating shaft 21 and the second rotating shaft 22. The first rotating shaft 21 has another end in connection with the first wing 24, while the second rotating shaft 22 has another end in connection with the second wing 25. The first rotating shaft 21 and the second rotating shaft 22 are controlled via a controlling system 13 so as to drive the first wing 24 and the second wing 25 to displace. Moreover, as shown in FIG. 2D, the protruding part 111 is capable of being attached onto the end face of the first wing 24, and the second wing 25 has one end face provided with a recessed part 251 engageable with the protruding part 111 on the internal wall of the main wing 11. Thereby, as shown in FIGS. 3C, 4C and 5C, when the second wing 25 is upwardly moved to the surface of the main wing 11, it is stopped by the protruding part 111, so as to evenly cover the space 12 of the main wing 11. In this way, by raising the first wings 24 upwardly to be used as vertical tails, the stealth aircraft could be provided with enhanced controllability and stable safety, so that many specified actions could be performed. Moreover, by raising the second wings 25 or lowering the first wings 24, the surface of the main wing could be kept intact, so as to maintain the original buoyancy conforming to fluid mechanics.

In implementation, when the first wing 24 is moved to cover and enclose the opening of the space 12 of the main wing 11, the second wing 25 is driven by the first rotating shaft 21 and the second rotating shaft 22 to be located within the space 12. Moreover, as shown in FIGS. 2A to 2E, the end face of the first wing 24 can be closely attached with the protruding part 111 of the main wing 11, so as to keep intact the surface of the main wing 11. When the first wing 24 is moved upwardly away from the space 12 via the control of the controlling system 13 at any angle with respect to the main wing 11 to perform a vertical tail's function, as shown in FIGS. 3A to 6B, the second wing 25 is driven by the first rotating shaft 21 and the second rotating shaft 22 to displace upwardly until the recessed part 251 on the end face of the second wing 25 is abutted with the protruding part 111. In this way, the second wing 25 covers and encloses the opening of the space 12 so as to keep intact the surface of the main wing 11.

Thereby, as shown in FIGS. 7A to 20C, no matter what kinds of aircrafts are involved, in accordance with different actual needs, the first wings 24 of the stealth double wings 2 can be raised manually by a pilot or automatically by a computer to perform the function of a vertical tail in order to enhance the controllability, while the stealth double wings 2 also can be lowered in a similar way to fold the first wing 24 back to the main wing. No matter the stealth double wings 2 are folded (lowered) or unfolded (raised), the first wing 24 and the second wing 25 are capable of maintaining the even pressure distribution on the surface of the main wing 11, so as to enhance the stability and maintain the buoyancy conforming to fluid mechanics, and provide the aircraft as a whole with excellent flexible controllability and improved performance.

Therefore, the present invention has following advantages:

1. Combination of radar-stealth effect and combat flight:
    The stealth double wings according to the present invention can fulfill the requirements for performing a variety of missions, have radar-stealth effect and enhanced controllability in flight, combine the flight performance of the fourth generation fighters with the advantage of the fifth generation stealth fighter, so as to meet the needs of the sixth generation stealth fighters and various other stealth military aircrafts.
2. Adjustment of vertical tails at a variety of angles and the maintenance of the effect of a main wing:
    The stealth double wings performing the function of vertical tails according to the present invention can be adjusted at a variety angles in accordance with the needs of different missions or flight, so as to obtain the optimal flight performance while keep the wings intact.
3. Capable of solving the problem in supersonic flight for the fighters without vertical tails:
    Fighters without vertical tails have been entangled with the problem in supersonic flight. In this case, the stealth double wings of the present invention are capable of enhancing the stability of supersonic flight, saving fuels, and increasing flying range.
4. Capable of enhancing the safety for controlling the take-off and landing of aircrafts without vertical tails:
    The stealth double wings are designed for enhancing the safety for controlling the take-off and the landing of fighters without vertical tails in a base. Moreover, they are also suitable for the stealth fighters without vertical tails on an aircraft carrier to enhance the controllability especially under bad weather conditions, so as to ensure the safety of pilots and the aircrafts.
5. Capable of elevating the flexibility in air operations and performing highly difficult combat flights:
    By means of the stealth double wings used as vertical tails and wing surface design, it is capable of enhancing the stability and flexibility for the control, so as to achieve high combat survivability and high achievement rate of missions.
6. Capable of altering the design for the stealth military aircrafts in the future:
    It is able to improve the reasonableness of the design for the next generation aircrafts without vertical tails, to be suitable for aircrafts without vertical tails adopting different radar stealth mechanisms, and to increase the size and the carrying capacity of the aircrafts.
7. The modular design for the stealth double wings:
    The stealth double wings can be modularized for various kinds of military aircrafts without vertical tails.
8. Capable of enhancing the stability and the safety for the aerial refueling:
    By using the stealth double wings, it is capable of enhancing the stability and safety of the aircrafts during the process of aerial refueling, and such design is applicable to the stealth unmanned tankers or other flying-wing tankers (as shown in FIGS. 7 and 10).
9. Capable of improving the flight performance further by the cooperation of fore wings:
    The stealth double wings can be used together with the fore wings of stealth fighters that have foreplane/canard function, so as to perform flight operations in a much more flexible way.

Although the embodiments of the present invention have been described in details, many modifications and variations may be made by those skilled in the art from the teachings disclosed hereinabove. Therefore, it should be understood that any modification and variation equivalent to the spirit of the present invention be regarded to fall into the scope defined by the appended claims.

In conclusion, according to above-disclosed descriptions, the present invention achieves the expected object to provide an aircraft with stealth double wings. It is novel and has industrial use.

What is claimed is:

1. An aircraft with stealth double wings, comprising:

a main body, two sides of which are respectively provided with a main wing having a surface into which a space is formed; and stealth double wings, each of which is located in the space of one main wing and includes a first rotating shaft, a second rotating shaft, a link rod, a first wing, and a second wing, where the link rod has two ends respectively in connection with the first rotating shaft and the second rotating shaft, the first rotating shaft has one end in connection with the first wing, and the second rotating shaft has one end in connection with the second wing;

wherein, when the first wing is moved to cover and enclose the space's opening, the second wing is driven by the first rotating shaft and the second rotating shaft to be located within the space; when the first wing is moved upwardly away from the space at an angle with respect to the main wing to perform a vertical tail's function, the second wing is driven by the first rotating shaft and the second rotating shaft to cover and enclose the space's opening so as to keep intact the surface of the main wing and maintain buoyancy conforming to fluid mechanics.

2. The aircraft with stealth double wings according to claim 1, wherein the first rotating shaft and the second rotating shaft of each of the stealth double wings are controlled via a controlling system so as to drive the first wing and the second wing to displace.

3. The aircraft with stealth double wings according to claim 1, wherein a protruding part is provided on an internal wall of the space of the main wing and the protruding part is capable of being attached onto the first wing's end-face.

4. The aircraft with stealth double wings according to claim 1, wherein the second wing has one end-face provided with a recessed part engageable with the protruding part on the internal wall of the main wing, so that when the second wing is upwardly moved to the surface of the main wing, it is stopped by the protruding part and evenly covers the space of the main wing.

* * * * *